(12) United States Patent
Tsai et al.

(10) Patent No.: US 10,878,844 B1
(45) Date of Patent: Dec. 29, 2020

(54) DATA STORAGE DEVICE CONTROLLING HEAD FLY HEIGHT BASED ON TEMPERATURE

(71) Applicant: Western Digital Technologies, Inc., San Jose, CA (US)

(72) Inventors: Chun Sei Tsai, Tustin, CA (US); Thao Hieu Banh, Lake Forest, CA (US); Steven L. Webb, Trabuco Canyon, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/817,138

(22) Filed: Mar. 12, 2020

(51) Int. Cl.
| G11B 5/54 | (2006.01) |
| G11B 33/14 | (2006.01) |
| G11B 5/60 | (2006.01) |
| G11B 20/18 | (2006.01) |

(52) U.S. Cl.
CPC ............ G11B 5/607 (2013.01); G11B 20/18 (2013.01)

(58) Field of Classification Search
CPC .......... G11B 5/6011; G11B 5/40; G11B 5/82; G11B 5/607; G11B 5/6076; G11B 5/54; G11B 33/14
USPC ................. 360/59, 75, 73.03, 69, 71, 97.12
See application file for complete search history.

(56) References Cited

U.S. PATENT DOCUMENTS

| 7,706,095 | B2 * | 4/2010 | Boutaghou | ............ G11B 19/28 360/75 |
| 7,733,595 | B2 * | 6/2010 | Lucas | .................. G11B 19/043 360/75 |
| 7,961,420 | B2 * | 6/2011 | Park | ..................... G11B 5/6064 360/75 |
| 7,969,681 | B2 | 6/2011 | Satoh et al. | |
| 8,922,939 | B1 | 12/2014 | Knigge et al. | |
| 9,177,599 | B1 | 11/2015 | Camalig et al. | |
| 9,183,864 | B1 | 11/2015 | Haralson et al. | |
| 10,127,950 | B1 * | 11/2018 | Zhang | .................. G11B 5/3133 |
| 10,268,553 | B2 * | 4/2019 | Eggert | ..................... G06F 11/16 |
| 10,311,905 | B1 * | 6/2019 | Guo | ........................ G11B 5/82 |
| 2008/0247073 | A1 * | 10/2008 | Park | ..................... G11B 5/3136 360/59 |
| 2009/0195912 | A1 | 8/2009 | Sato | |

OTHER PUBLICATIONS

J. Zheng, "Dynamics and Stability of Thermal Flying-height Control Sliders in Hard Disk Drives," UC Berkeley Electronic Theses and Dissertations, University of California, Berkeley, 2012.

D. Tongsomporn; K. Vongsarath; R. Sivaratana; N. Afzulpurkar; B. Bargmann; A. Siritaratiwat, "An Experimental Study of Head Instabilities in TMR Sensors for Magnetic Recording Heads with Adaptive Flying Height," IEICE Trans. Electron., vol. E91-C, No. 12 Dec. 2008.

* cited by examiner

Primary Examiner — Nabil Z Hindi

(57) ABSTRACT

A data storage device is disclosed comprising a head actuated over a disk, wherein the head comprises a fly height actuator (FHA) configured to adjust a fly height of the head over the disk. A temperature of the data storage device is measured, and the FHA is controlled as a function of the measured temperature. A first quality metric of the data storage device is measured, and when the first quality metric falls below a threshold, the FHA control as a function of the measured temperature is disabled and the FHA is controlled to decrease the fly height of the head.

19 Claims, 5 Drawing Sheets

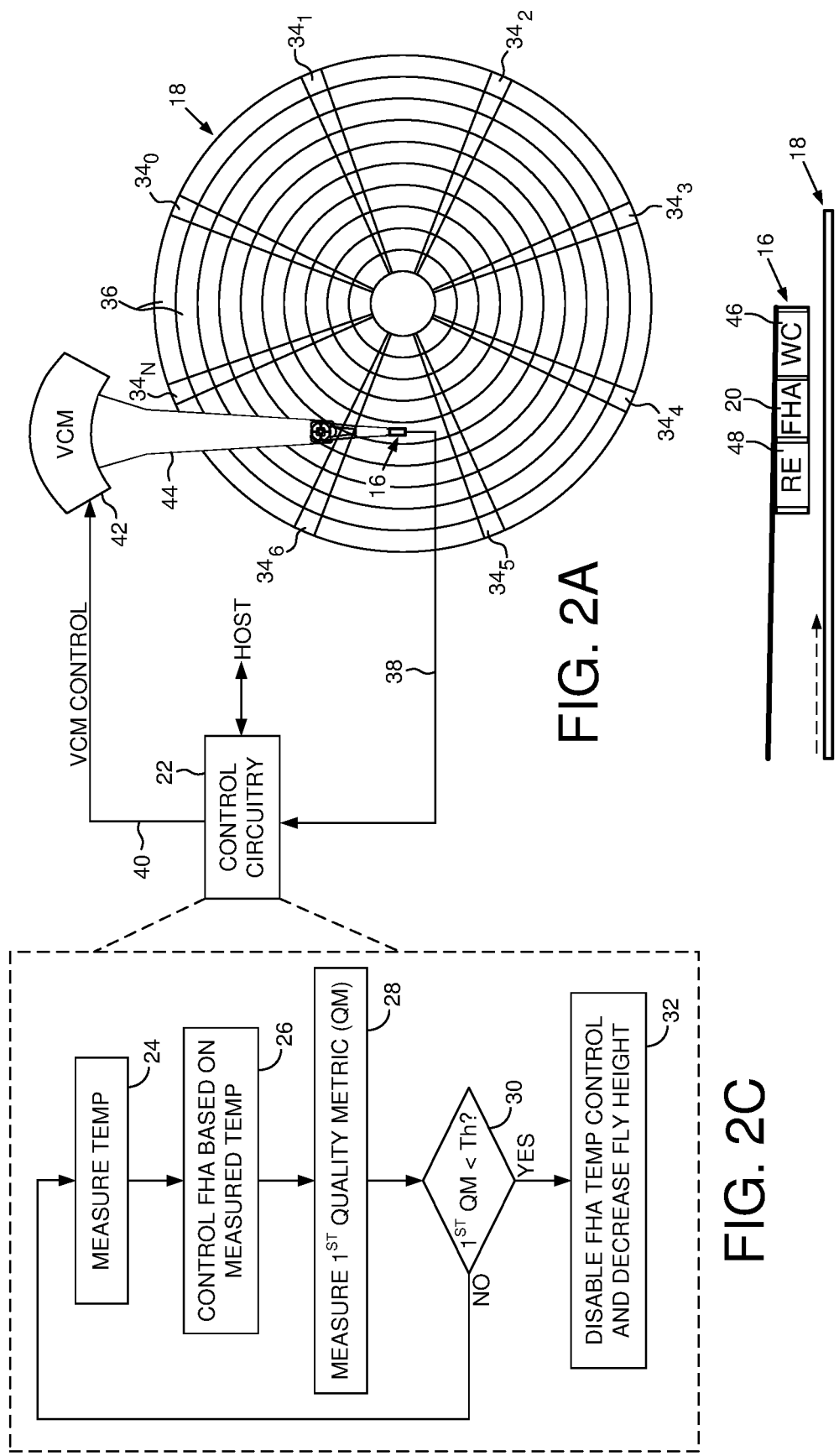

DATA STORAGE DEVICE CONTROLLING HEAD FLY HEIGHT BASED ON TEMPERATURE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 61 further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a data storage device in the form of a disk drive according to an embodiment comprising a head actuated over a disk.

FIG. 2C is a flow diagram according to an embodiment wherein a fly height actuator (FHA) is controlled as a function of a measured temperature, wherein when a first quality metric falls below a threshold the FHA temperature control is disabled and the fly height of the head is decreased.

DETAILED DESCRIPTION

Figure 1:
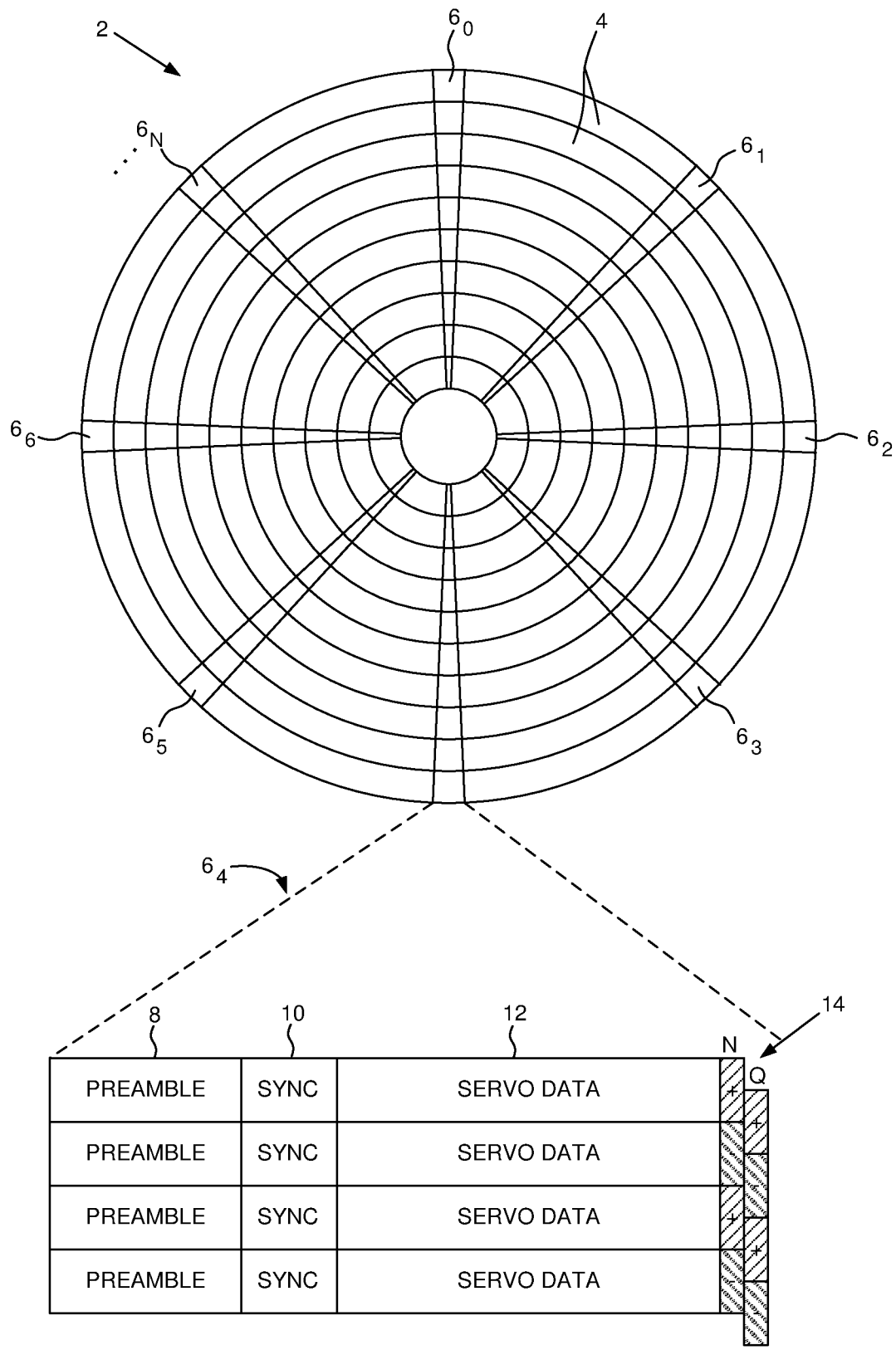
FIG. 1 shows a prior art disk format comprising a plurality of servo tracks defined by servo sectors.

FIGS. 2A and 2B show a data storage device in the form of a disk drive according to an embodiment comprising a head 16 actuated over a disk 18, wherein the head comprises a fly height actuator (FHA) 20 configured to adjust a fly height of the head 16 over the disk 18. The disk drive further comprises control circuitry 22 configured to execute the flow diagram of FIG. 2C, wherein a temperature of the disk drive is measured (block 24), and the FHA is controlled as a function of the measured temperature (block 26). A first quality metric of the disk drive is measured (block 28), and when the first quality metric falls a threshold (block 30), the FHA control as a function of the measured temperature is disabled and the FHA is controlled to decrease the fly height of the head (block 32).

In the embodiment of FIG. 2A, the disk 18 comprises a plurality of servo sectors $34_0$-$34_N$ that define a plurality of servo tracks, wherein data tracks 36 are defined relative to the servo tracks at the same or different radial density. The control circuitry 22 processes a read signal 38 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 40 applied to a VCM 42 which rotates an actuator arm 44 about a pivot in order to actuate the head radially over the disk in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2B, the head 16 comprises a suitable write element 46 (e.g., an inductive coil), a suitable read element 48 (e.g., a magnetoresistive element), and a suitable fly height actuator (FHA) 20 configured to control a fly height of the head 16 over the disk 18. Any suitable FHA 20 may be employed, such as a heater that actuates through thermal expansion, or a piezoelectric actuator that actuates through mechanical deflection. In other embodiments, the head 16 may further comprise a suitable energy assist element that facilitates write operations, such as a suitable laser configured to heat the disk surface (e.g., a laser diode) to implement heat assisted magnetic recording (HAMR), or a suitable spin torque oscillator (STO) configured to generate an axillary magnetic field to implement microwave assisted magnetic recording (MAMR).

In one embodiment, one or more components of the head 16 such as shown in FIG. 2B may degrade over time, wherein the degradation may accelerate with the operating temperature of the component. Eventually the degradation of a head component may render the component inoperable, thereby disabling write and/or read operations for the corresponding disk surface. In one embodiment, increasing the control setting of the FHA 20 in order to decrease the fly height of the head 16 increases the temperature of the FHA 20, which can also increase the temperature of the other head components (through conductive or radiant heating). The heating effect of the FHA may be further exacerbated by the ambient temperature of the disk drive; that is, the ambient temperature of the disk drive may operate as a DC offset that is added to the heating effect of the FHA, thereby further increasing the operating temperature of the head components. Accordingly in one embodiment when the ambient temperature of the disk drive increases, the control signal applied to the FHA 20 is decreased (thereby increasing the fly height of the head) in order to reduce the heating effect of the FHA 20 and overall temperature of the head component(s).

Figure 3A:
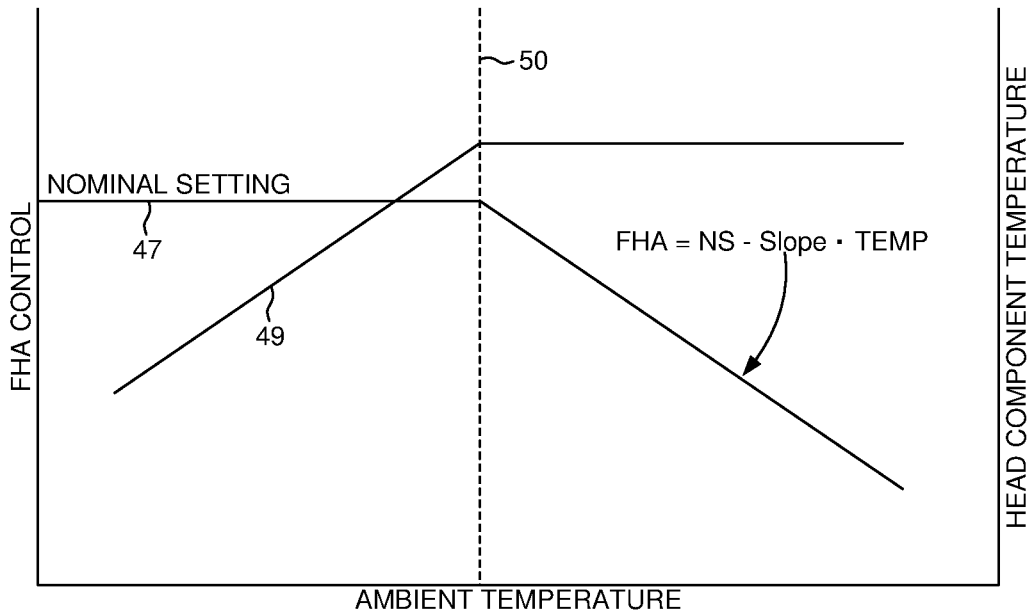
FIG. 3A shows an embodiment wherein the FHA is controlled as a linear function of the measured temperature.

An example of this embodiment is shown in FIG. 3A which shows a first relationship 47 between the FHA control setting and an ambient temperature, and a second relationship 49 between a head component temperature and the ambient temperature, which in this embodiment shows a linear increase of the head component temperature with increasing ambient temperature. In this embodiment, a nominal control setting is applied to the FHA 20 in order to maintain the fly height of the head at a nominal fly height during access operations. In one embodiment, there may be a nominal write control setting for the FHA 20 used during write operations, and a nominal read control setting for the FHA 20 used during read operations. In this embodiment when the ambient temperature rises above a knee threshold 50, the control setting for the FHA 20 is reduced as a function of the ambient temperature in order to limit the temperature increase of one or more head components. The control setting for the FHA 20 may be reduced based on any suitable function, wherein in the example of FIG. 3A the control setting may be reduced based on a linear function of the ambient temperature.

In one embodiment, one or more of the parameters shown in FIG. 3A may be calibrated by the control circuitry 22, such as the nominal setting of the FHA, the knee threshold 50 for the ambient temperature, the temperature limit for the head component(s), and/or the slope of the temperature control function. For example, in one embodiment the control circuitry 22 may execute one or more calibration procedures to estimate the quality of each head in the disk drive, for example, to predict the durability of each head. As the durability of a head increases, there may be a corresponding adjustment to one or more parameters of FIG. 3A, such as increasing the knee threshold 50 for the ambient temperature, increasing the temperature limit of the head component(s), and/or decreasing the slope of the linear function.

Figure 3B:
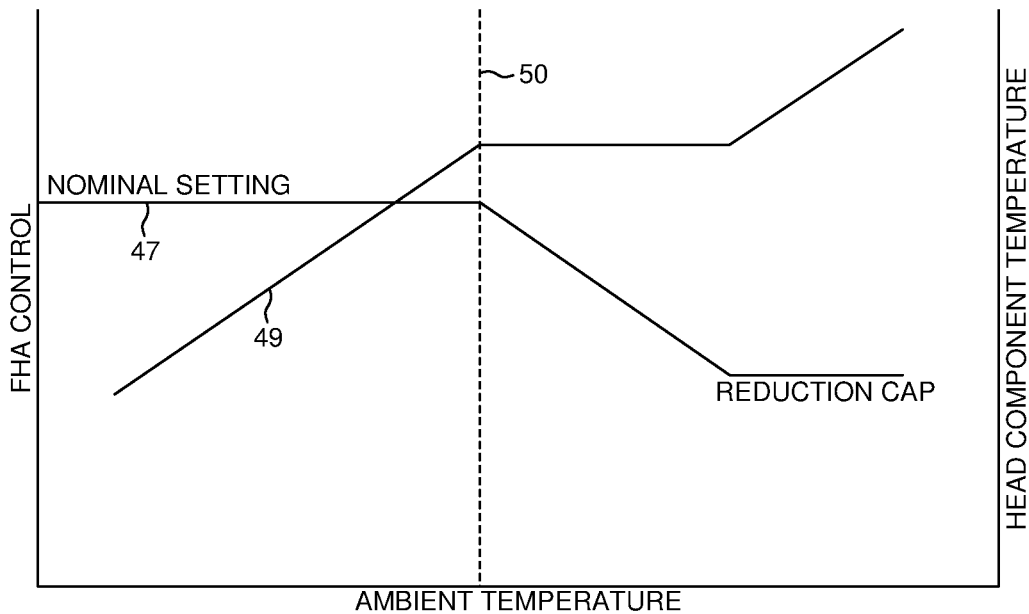
FIG. 3B shows an embodiment wherein the FHA is controlled based on a reduction cap in order to limit the maximum fly height of the head.

In one embodiment, reducing the control setting for the FHA 20 in order to limit the temperature of the head component(s) means there is a corresponding increase in the fly height of the head away from a nominal fly height. As the fly height increases, the quality of the written data during write operations may decrease and/or the signal-to-noise ratio (SNR) of the read signal during read operations may decrease due to the increase in the head/media spacing. In one embodiment shown in FIG. 3B, there may be a cap on the reduction in the control setting of the FHA 20 so as to limit the increase in fly height and corresponding increase in the head/media spacing. That is, in one embodiment the reduction in the FHA control setting may be limited to ensure that data written to the disk remains recoverable. Similar to the other parameters of FIG. 3B, in one embodiment the reduction cap may be configured based on a measured quality of the corresponding head. That is, higher quality heads may operate reliably at increased head/media spacing which enables a lower threshold for the reduction cap. In one embodiment, the quality of the head may be measured periodically during the lifetime of the disk drive and corresponding adjustments made to the reduction cap as the quality of the head degrades over time.

In one embodiment, while the FHA control setting is reduced as a function of the measured temperature a first quality metric may be measured periodically to ensure the data written to the disk will remain recoverable even though the fly height of the head has increased. When the first quality metric falls below a predetermined threshold, adjusting the FHA control as a function of the measured temperature is disabled and the FHA 20 is controlled to decrease the fly height of the head. Any suitable metric may be used to disable the temperature compensating FHA control, wherein in one embodiment the first metric may be based at least on a measured bit error rate of the data written to the disk at the higher fly height. In other embodiments, the first metric may be based on a measurement that correlates with the bit error rate, such as a measured signal-to-noise ratio (SNR) of the read signal while reading data that was written at the higher fly height. In one embodiment, the first metric may be measured while reading previously written user data, and in another embodiment the control circuitry may periodically execute a test procedure in order to measure the first metric. Any suitable test procedure may be executed, wherein in one embodiment test data may be written to and read from a dedicated area of the disk in order to facilitate any suitable measurement, such as bit error rate, SNR of the read signal, error margin, overwrite capability, etc.

Figure 4A:
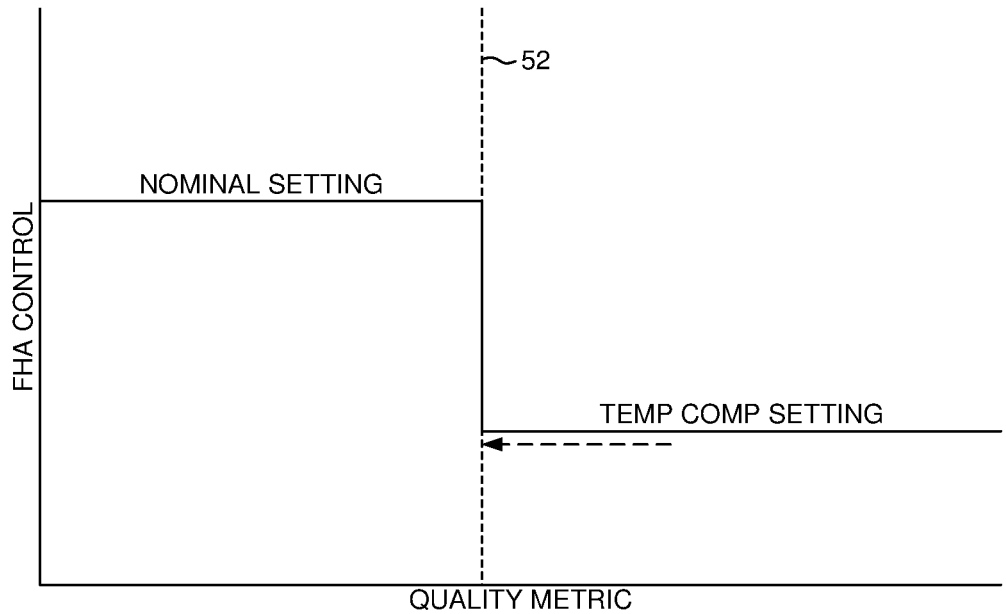
FIG. 4A shows an embodiment wherein a nominal setting is calibrated for the FHA which is then used to control the fly height of the head when the first quality metric falls below the threshold.

In one embodiment shown in FIG. 4A, the temperature compensating FHA control may be enabled so as to increase the head's fly height and then disabled if the first quality metric (e.g., bit error rate) falls below a predetermined threshold 52. In this embodiment, when the first quality metric falls below the threshold 52, the FHA control setting is reverted back to the nominal setting, thereby decreasing the head's fly height to the nominal fly height (e.g., a calibrated fly height). In one embodiment, the predetermined threshold 52 may be implemented as a hysteretic threshold to prevent the temperature compensating FHA control from oscillating between enabled and disabled.

Figure 4B:
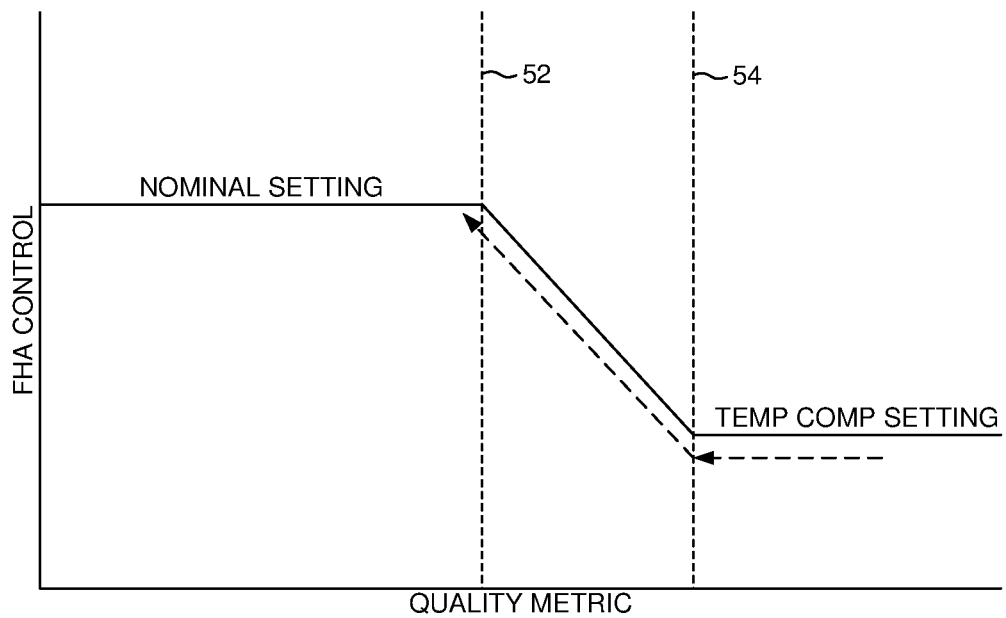
FIG. 4B shows an embodiment wherein the control setting for the FHA is increased linearly toward the nominal control setting based on the first quality metric.

FIG. 4B shows an embodiment wherein when the first quality metric falls below a second predetermined threshold 54, the FHA control setting may be reduced (and the fly height decreased) as a function of the first quality metric (e.g., a linear function). In this embodiment when the first quality metric falls to the first threshold 52, the FHA control setting increases to the nominal setting such that the head reaches the nominal fly height to ensure the data written to the disk remains recoverable.

In one embodiment, the first quality metric (e.g., bit error rate) used to disable the temperature compensating FHA control may be relatively noisy and therefor may be low-pass filtered so that outliers are ignored. For example, a bit error rate measurement may be affected not only by the fly height of the head, but also by other transient factors such as defects on the disk surface and physical shocks to the disk drive that may occur while accessing the disk surface. However, low-pass filtering the first quality metric may also unnecessarily delay re-enabling the temperature compensating FHA control which means unnecessarily degrading the head component(s) due to the higher operating temperature. Accordingly in one embodiment, the temperature compensating FHA control may be disabled based on a first quality metric (e.g., bit error rate), and re-enabled based on a second quality metric having a higher sensitivity than the first quality metric.

Figure 5:
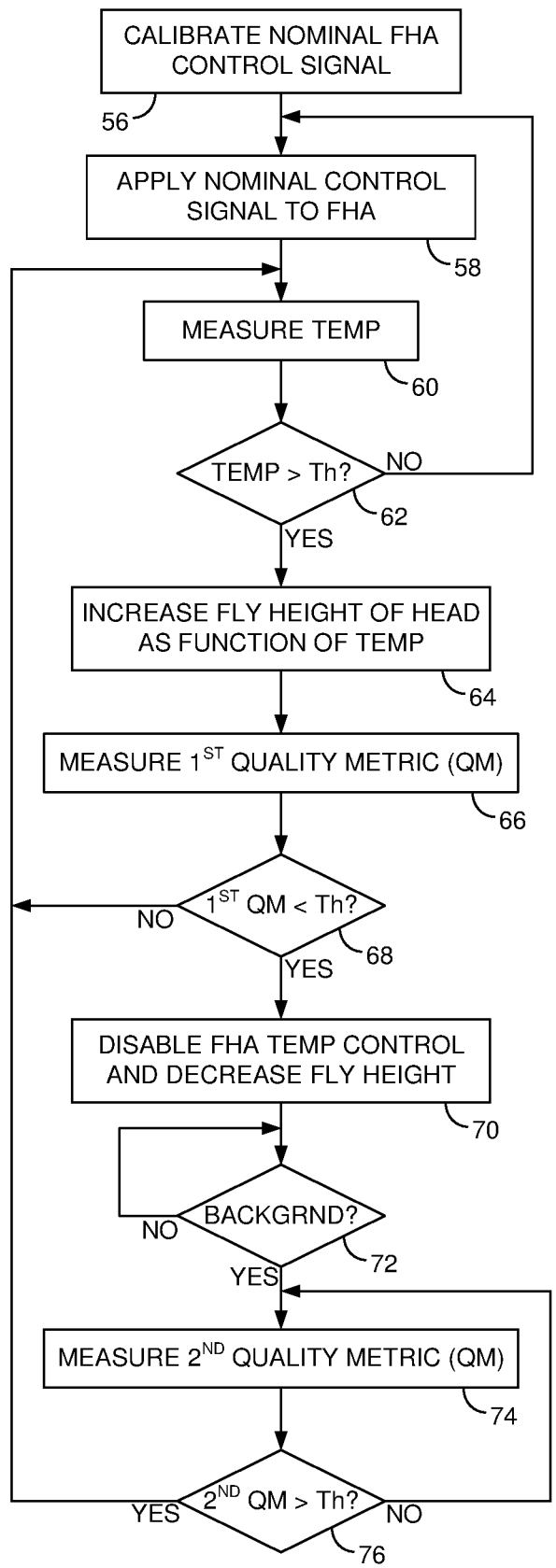
FIG. 5 is a flow diagram according to an embodiment wherein during a background operation a second quality metric is measured, and when the second quality metric rises above a threshold, the FHA temperature control is re-enabled.

An example of this embodiment is understood with reference to the flow diagram of FIG. 5, wherein in this embodiment a nominal FHA control setting may be calibrated by the control circuitry 22 executing any suitable calibration procedure (block 56). For example, in one embodiment the calibration procedure may increase the FHA control setting until a touchdown of the head onto the disk is detected, and then subtract a predetermined offset from the touchdown setting to generate the nominal setting. In one embodiment, the calibration procedure may be executed for both write and read operations so as to generate a separate nominal FHA control setting for write and read operations.

During write/read operations, the nominal FHA control setting is initially applied to the FHA in order to operate at the calibrated, nominal fly height (block 58) and a temperature of the disk drive is measured periodically (block 60). When the measured temperature rises above a predetermined knee threshold (block 62) such as shown in FIG. 3A, the FHA control setting is decreased as a function of the measured temperature in order to increase the fly height of the head (block 64). While the temperature compensating FHA control is enabled, a first quality metric (e.g., bit error rate) is measured (block 66), and when the first quality metric falls below a first threshold (block 68), controlling the FHA as a function of the measured temperature is disabled, and the FHA is controlled to decrease the fly height of the head (block 70).

During a background operation (block 72), a second quality metric is measured (block 74) to determine whether to re-enable the temperature compensating FHA control. The background operation may be executed during an idle mode of the disk drive, or interleaved with the execution of host commands. In one embodiment, the frequency of measuring the second quality metric may vary based on the work load of the disk drive (e.g., the number and/or age of host access commands queued in a command queue). While the second quality metric remains below a second threshold (block 76), meaning that the performance of the disk drive remains degraded, the temperature compensating FHA control remains disabled. When the second quality metric rises above the second threshold (block 76), meaning the performance of the disk drive has improved, the temperature compensating FHA control is re-enabled and the flow diagram of FIG. 5 continues from block 60.

In one embodiment, the second quality metric used to re-enable the temperature compensating FHA control has a higher sensitivity than the first quality metric used to disable to temperature compensating FHA control. For example, in one embodiment the first quality metric is based on a low-passed filtered bit error rate measurement, whereas the second quality metric may be based on a more sensitive metric such as SNR of the read signal, error margin, overwrite capability, etc. In one embodiment, the control circuitry may execute a suitable test procedure in order to measure the second quality metric by writing/reading a test pattern to/from a dedicated area of the disk. For example, writing/reading a test pattern may expedited measuring SNR of the read signal, error margin, or an overwrite capability at a given fly height of the head. In addition, measuring the second quality metric by writing/reading data to/from a dedicated area of the disk may avoid other factors that can degrade the performance of the disk drive, such defects on the disk or adjacent track interference due to shock events that may occur randomly while writing user data to the data tracks of the disk.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a fly height actuator (FHA) configured to adjust a fly height of the head over the disk;
   control circuitry configured to:
      measure a temperature of the data storage device;
      control the FHA as a function of the measured temperature;
      measure a first quality metric of the data storage device; and
      when the first quality metric falls below a threshold, disable the FHA control as a function of the measured temperature and control the FHA to decrease the fly height of the head.

2. The data storage device as recited in claim 1, wherein the control circuitry is further configured to increase the fly height of the head when the measured temperature exceeds a knee threshold.

3. The data storage device as recited in claim 1, wherein the function of the measured temperature is a linear function having a slope.

4. The data storage device as recited in claim 3, wherein the control circuitry is further configured to:
   measure a quality metric of the head; and
   configure the slope based on the measured quality metric of the head.

5. The data storage device as recited in claim 1, wherein the first quality metric is based on a bit error rate of the data storage device.

6. The data storage device as recited in claim 1, wherein after disabling the FHA control as a function of the measured temperature, the control circuitry is further configured to:
   measure a second quality metric of the data storage device; and
   when the second quality metric exceeds a threshold, re-enable the FHA control as a function of the measured temperature.

7. The data storage device as recited in claim 6, wherein the first quality metric is based on a bit error rate of the data storage device.

8. The data storage device as recited in claim 7, wherein the second quality metric is based on at least one of an overwrite metric, a signal-to-noise ratio (SNR) metric, or an error margin metric.

9. The data storage device as recited in claim 7, wherein the control circuitry is further configured to periodically measure the second quality metric during a background operation.

10. A data storage device comprising:
    a disk;
    a head actuated over the disk, wherein the head comprises a fly height actuator (FHA) configured to adjust a fly height of the head over the disk;
    control circuitry configured to:
       calibrate a nominal control setting for the FHA that achieves a nominal fly height of the head;
       measure a temperature of the data storage device;
       control the FHA to control the fly height of the head as a function of the measured temperature;
       measure a first quality metric of the data storage device; and
       when the first quality metric falls below a threshold, disable the FHA control as a function of the measured temperature and apply the nominal control setting to the FHA.

11. The data storage device as recited in claim 10, wherein the control circuitry is further configured to increase the fly height of the head as the function of the measured temperature when the measured temperature exceeds a knee threshold.

12. The data storage device as recited in claim 10, wherein the function is a linear function having a slope.

13. The data storage device as recited in claim 12, wherein the control circuitry is further configured to:
    measure a quality metric of the head; and
    configure the slope based on the measured quality metric of the head.

14. The data storage device as recited in claim 10, wherein the first quality metric is based on a bit error rate of the data storage device.

15. The data storage device as recited in claim 10, wherein after disabling the FHA control as the function of the temperature, the control circuitry is further configured to:
    measure a second quality metric of the data storage device; and
    when the second quality metric exceeds a threshold, re-enable the FHA control as the function of the temperature.

16. The data storage device as recited in claim 15, wherein the first quality metric is based on a bit error rate of the data storage device.

17. The data storage device as recited in claim 16, wherein the second quality metric comprises at least one of an overwrite metric, a signal-to-noise ratio (SNR) metric, or an error margin metric.

18. The data storage device as recited in claim 16, wherein the control circuitry is further configured to periodically measure the second quality metric during a background operation.

19. A data storage device comprising:
    a disk;
    a head actuated over the disk, wherein the head comprises a fly height actuator (FHA) configured to adjust a fly height of the head over the disk; and
    a means for measuring a temperature of the data storage device;
    a means for controlling the FHA as a function of the measured temperature;
    a means for measuring a first quality metric of the data storage device; and
    when the first quality metric falls below a threshold, a means for disabling the FHA control as a function of the measured temperature and control the FHA to decrease the fly height of the head.

* * * * *